United States Patent [19]
Weigele

[11] Patent Number: 4,936,224
[45] Date of Patent: Jun. 26, 1990

[54] APPARATUS FOR CONVEYING MOTOR VEHICLES INTO VEHICLE WASHING INSTALLATIONS

[76] Inventor: Gebhard Weigele, Am Schoenblick 1a, D - 8902 Neusaess, Fed. Rep. of Germany

[21] Appl. No.: 247,874

[22] Filed: Sep. 22, 1988

[30] Foreign Application Priority Data

Sep. 26, 1987 [DE] Fed. Rep. of Germany ... 8713008[U]

[51] Int. Cl.$^5$ ............................................. B61B 13/00
[52] U.S. Cl. ............................... 104/172.3; 104/172.5
[58] Field of Search ........................ 104/172.3, 172.5; 198/732, 779; 414/253, 257

[56] References Cited

U.S. PATENT DOCUMENTS

| | | | |
|---|---|---|---|
| 3,058,433 | 10/1962 | Hurst | 104/172.3 |
| 3,403,635 | 10/1968 | Smith | 104/172.3 |
| 3,526,193 | 9/1970 | Vani | 104/172.3 |
| 3,596,606 | 8/1971 | Smith, Jr. et al. | 104/172.3 |
| 3,848,542 | 11/1974 | Schied et al. | 104/172.3 |
| 4,194,449 | 3/1980 | Breau | 104/172.3 |

Primary Examiner—Andres Kashnikow
Assistant Examiner—Karen B. Merritt
Attorney, Agent, or Firm—Flynn, Thiel, Boutell & Tanis

[57] ABSTRACT

An apparatus for conveying motor vehicles into vehicle washing installations comprises two endless conveying chains (1) running at a distance (A) from each other and parallel to each other. Between the two chains (1) there are arranged bearing shafts (7) at right angles thereto and separated from each other, said bearing shafts (7) each carrying a driving roll (10) engaging with a vehicle wheel. Below each chain (1) there is arranged a slide strip (2), on which the chain is supported. The chains (1) are guided by chain guide rails (3) running in the longitudinal direction of the chains. Between the chains (1) there is provided a travel path (12). The chains (1) are arranged at a distance above the travel path (12). The conveying chains (1) themselves are constructed as side guides for the vehicle wheel. At the same time, the chain guide rails (3) are so arranged and constructed that direct contact between the vehicle wheel and the conveying chains (1) is possible.

19 Claims, 3 Drawing Sheets

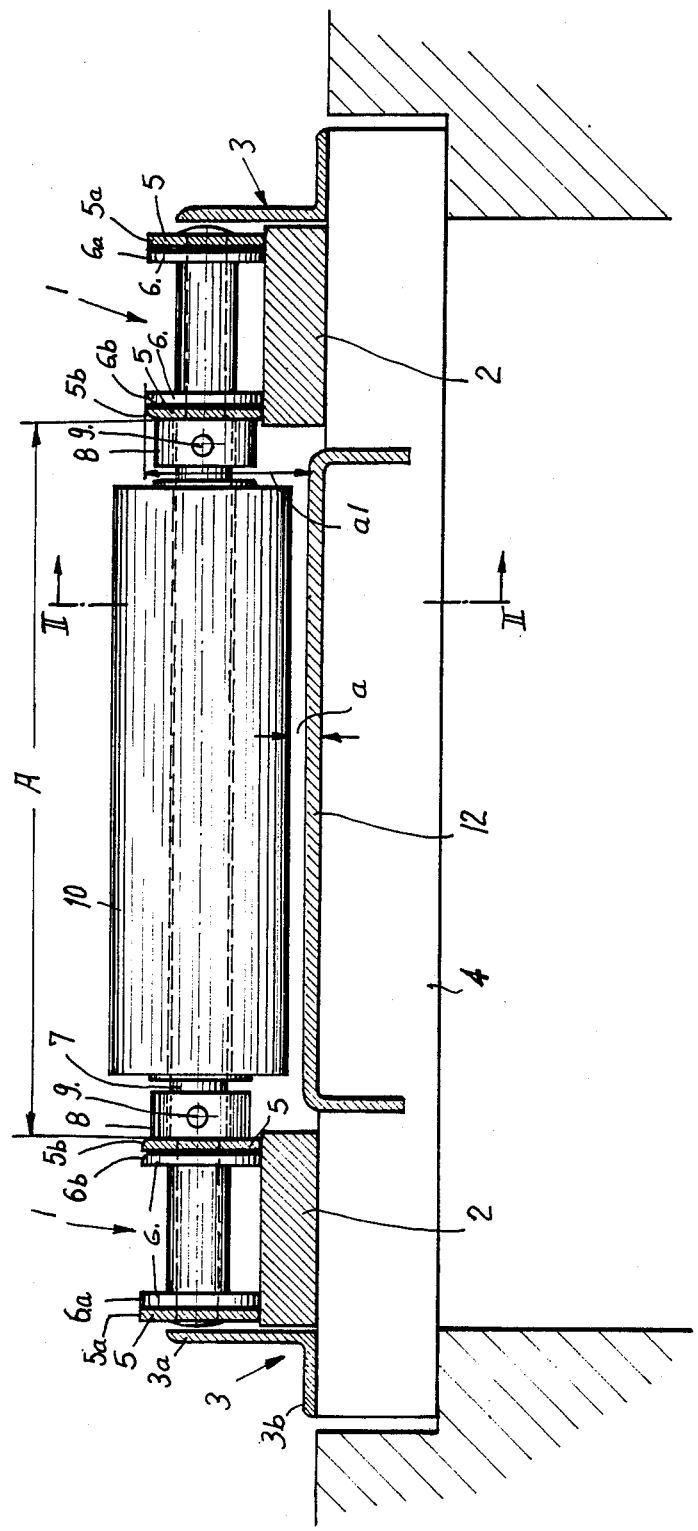

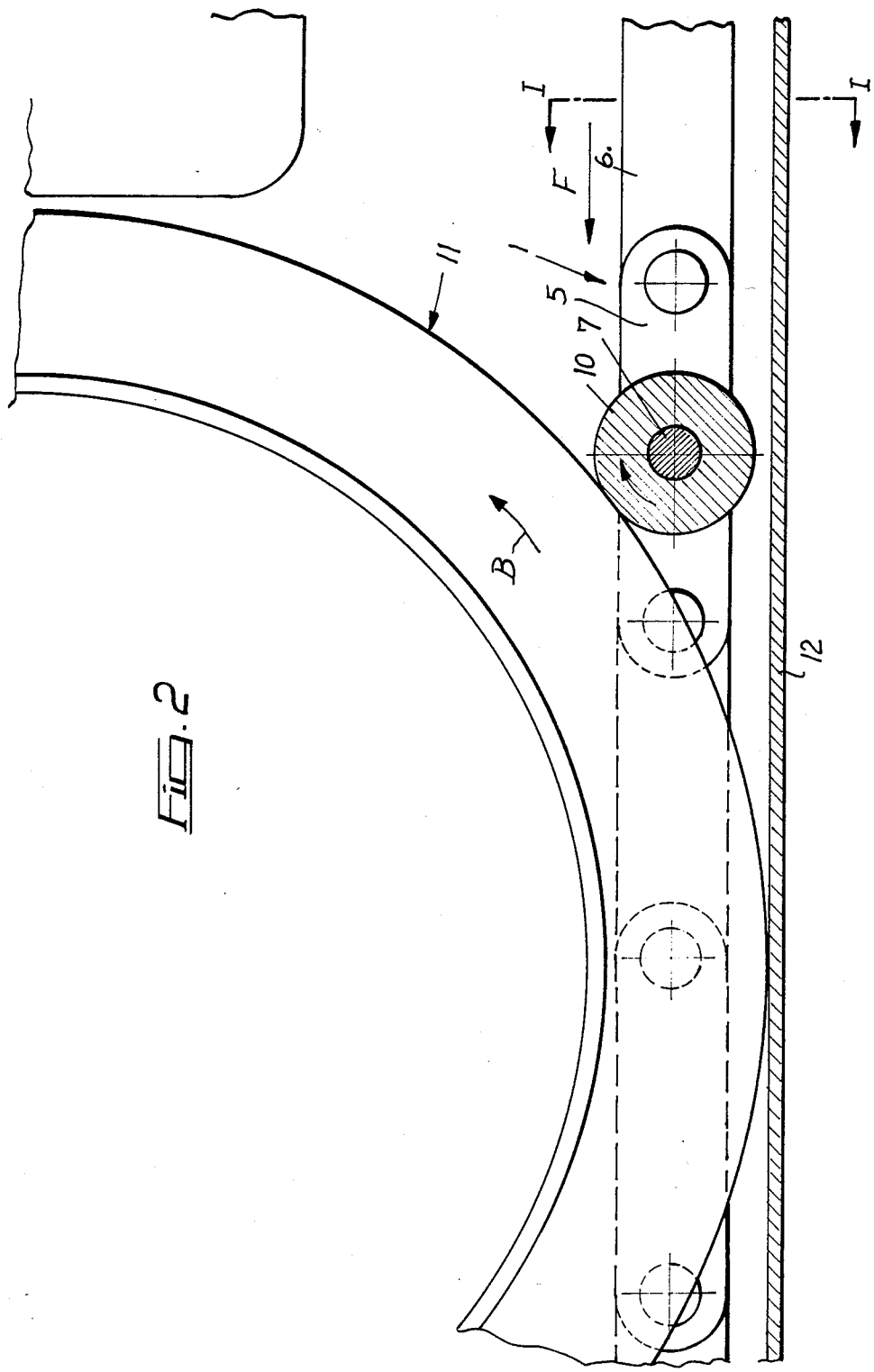

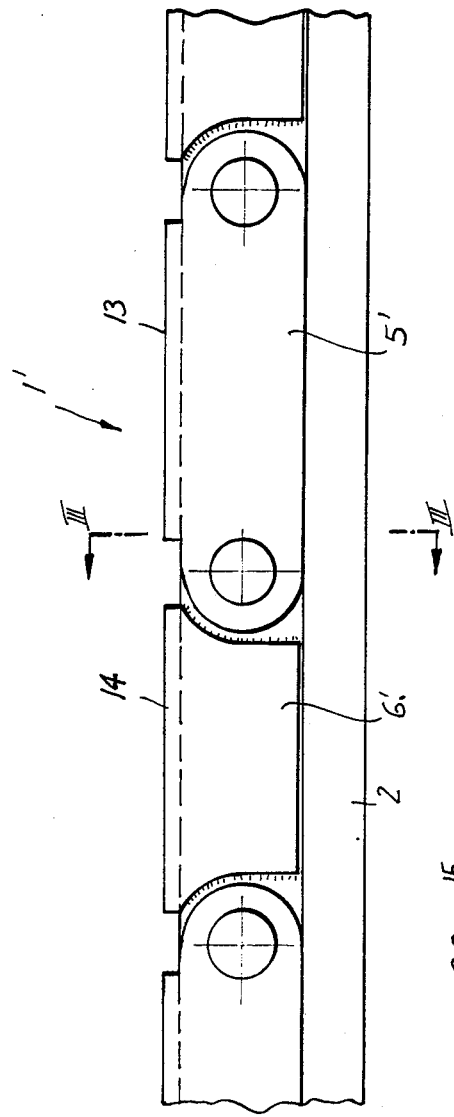

APPARATUS FOR CONVEYING MOTOR VEHICLES INTO VEHICLE WASHING INSTALLATIONS

FIELD OF THE INVENTION

The invention relates to an apparatus for conveying vehicles into vehicle washing installations, with two endless, spaced, parallel conveying chains guided in the longitudinal direction of the washing installation and especially constructed as plate link chains, the upper edges of which are arranged over a travel path for the vehicle wheel, with several spaced bearing shafts arranged between the two conveying chains at right angles thereto, which bearing shafts each carry a driving roll engaging with a vehicle wheel, with slide strips extending in the longitudinal direction of the chains and each arranged under the associated conveying chain, the conveying chains being supported on said slide strips and the driving rolls also being held thereby at a distance from a travel path provided between the two conveying chains, with chain guide rails running in the longitudinal direction of the chains and with two side guides for the vehicle wheel running in the longitudinal direction of the chains and arranged at a distance above the travel path.

BACKGROUND OF THE INVENTION

In a known apparatus of this type a chain guide rail is provided on the outside conveying chain remote from the vehicle wheel. This chain guide rail is constructed as an angle section, the horizontal leg of the angle section being welded to the supporting structure of the conveying apparatus while the vertical leg is arranged at a slight distance from the outside of the chain and serves to guide the chain. In the known apparatus the vertical leg is bent above the associated chain 90° towards the vehicle wheel and extends over more than the chain width. The inner edge, facing the vehicle wheel, of this horizontal bent part is rolled in and forms the side guide for the vehicle wheel. The rolled-in edge extends so far towards the center of the travel path that the chain is covered completely at the top and direct contact between the vehicle wheel and the chain is impossible. The side guides hold the wheel in the track, said wheel rolling along between the side guides on the travel path and being pushed by the driving roll. If, however, the vehicle wheel is turned or strikes strongly against the side guide there is so much friction that the wheel rolls over the side guide and the vehicle thereby drives off the track. This can lead to considerable damage to the vehicle and/or the washing device (this including a drying device located downstream thereof). In order to prevent this overrolling of the side guides, the side guides must be arranged at a relatively long distance from the travel path or, in other words, a relatively great height above the travel path. This leads to low-slung vehicles with little ground clearance no longer being washable or at least being likely to suffer damage to the vehicle and possibly also to inflict damage on the conveying apparatus. Furthermore, the wheel rims of vehicles which are provided with low section tires, are damaged by direct friction of the rims against the side guides, because the side guides are arranged at a height of approximately 80 to 120 mm from the travel path, while the rims of low section tires are at a distance of only 50 to 60 mm from the travel path. So that the vehicle wheels can be steered as little as possible, the track width i.e. the internal distance between the two side guides, should be as small as possible. Because of the above-mentioned low section tires and larger vehicles with correspondingly wider tires, the track width has, however, to be made relatively large. This then leads to difficulties with smaller vehicles with narrow tires, since then the vehicle wheels can again be steered at a relatively large angle. Moreover, the side guides require additional structural expenditure, since they are provided in addition to the chain guides and must, because of the possibility of overrolling by the vehicle wheel, be constructed to be relatively stable. Finally, high side guides prevent wheel rim washing brushes from reaching the wheel rims when the tires are the above-mentioned low section tires. The rims are only insufficiently washed at the outer edge and it is possible, moreover, by contact between the washing brush and the side guides, for the washing brush to be damaged or to suffer increased wear.

Therefore, the problem on which the invention is based is that of providing an apparatus for conveying motor vehicles into washing installations of the above-mentioned type, which prevents with certainty a vehicle from finding its way off the track, which is suited to damage-free conveyance of vehicles both with very wide tires and low section tires and which is nevertheless of simpler construction and therefore cheaper to produce and easier to maintain.

This is achieved according to the invention in that the conveying chains themselves or elements moved synchronously with the conveying chains are constructed as side guides for the vehicle wheel and in that the chain guide rails are so arranged and constructed that direct contact between the vehicle wheel and the conveying chains or the synchronously moved elements is possible.

In contrast to the previous prior art, in which the side guides were also intended to prevent contact between the vehicle wheel and the conveying chains, the invention dispenses completely with such stationary side guides. Instead, in the apparatus according to the invention direct contact between the vehicle wheel and the conveying chains is made by dispensing with additional side guides and by appropriate construction of the chain guide rails. The conveying chains themselves form the side guides. They may at the same time be arranged at a relatively long distance from each other, such that even vehicles with very wide tires or low section tires fit without problem between the chains. Furthermore, it is possible to arrange the conveying chains at a height so small a distance from the travel path that upper edges of the conveying chains are arranged at a height of at most approximately 60 mm, but also of less, for example only 40 mm, from the travel path. The low height of the conveying chains eliminates damage to the wheel rims of low section tires. However, it was noted surprisingly that the conveying chains serving as side guides hold the vehicle in the track and overrolling of the conveying chains by the vehicle does not occur even when the vehicle wheel is greatly turned. It was noted that although a highly turned vehicle wheel is pushed onto one of the conveying chains under the action of the driving roll, it does not then roll over the conveying chain. The vehicle wheel is lifted hereby from the travel path and then lies only on the conveying chain and the driving roll. However, as soon as the vehicle wheel loses contact with the travel path, it stops rotating. Then, no more relative movement takes place between the wheel and the conveying chain moving at the same speed as the vehicle, such that although the vehicle wheel rolls partially onto the conveying chain it does not roll over it. Since the vehicle wheel rolls only very slightly onto the conveying chain before it loses contact with the travel path, the conveying chain still offers sufficient lateral guidance, which also prevents the turned wheel on the other side of the vehicle, which wheel is not moved and guided by the conveying apparatus, from pulling the vehicle off the track. Rather, it was noted that the vehicle is held on the track by the conveying chain and the turned, unguided wheel begins to skid. However, experience has shown that this extreme case only arises with very great manual turning of the vehicle wheels. When the steering wheel is released the vehicle wheels straighten themselves and the vehicle is conveyed on normally. If the driver ceases completely to turn the steering wheel, it may be noted that the vehicle wheel does not roll onto one of the conveying chains at all. Since in the apparatus according to the invention the conveying chains also assume the function of side guides, additional side guides are wholly unnecessary, which makes the construction simpler and production cheaper. Furthermore, the conveying chains can be more easily maintained and lubricated, since they are easily accessible. Because of the low height of the conveying chains the wheel rim washing brushes can also clean the rims of low section tires better and the risk of damage or premature wear to these wheel rim washing brushes through contact with side guides arranged high above the travel path does not arise.

BRIEF DESCRIPTION OF THE DRAWINGS

The invention is described in greater detail below with the aid of exemplary embodiments shown in the drawings, in which:

FIG. 1 shows a cross section through a first embodiment of the apparatus along line I—I of FIG. 2, FIG. 2 shows a longitudinal section along line II—II of FIG. 1, FIG. 3 shows a cross section through a second embodiment of a conveying chain along line III—III of FIG. 4, FIG. 4 shows a side view of this conveying chain in the direction IV of FIG. 3, FIG. 5 shows a cross section through a third embodiment.

DETAILED DESCRIPTION

The apparatus for conveying motor vehicles into vehicle washing installations firstly comprises two endless conveying chains 1 arranged at the distance A from each other and parallel to each other, only the upper strands of which conveyors are shown. These conveying chains 1 extend in the longitudinal direction of the washing installation, said washing installation also including a drying installation arranged downstream. Each of the conveying chains 1 is supported by a slide strip 2 provided under the chain and extending in the longitudinal direction of the chains. On the outer sides of the conveying chains 1 remote from each other there are arranged chain guide rails 3, which are advantageously constructed as angle sections. The vertical leg 3a of the chain guide rail 3 is arranged at a short distance from and parallel to the outside of the associated conveying chain 1 and the horizontal leg 3b is connected with a carrier structure 4. At this point the vertical leg 3a ends, as may be seen in FIG. 1, below the upper edges 5a, 6a of the chain members 5, 6.

Between the two conveying chains 1 there are provided bearing shafts 7, which extend at right angles to the longitudinal direction of the chains. The bearing shafts 7 are arranged at relatively large distances from each other. In order to connect them with the chains a bearing piece 8 is welded onto the inside of each of the chains. The respective end of the bearing shaft 7 is fixed in the bearing piece 8 by a cotter pin 9. Each bearing shaft 7 carries roll 10 rotatable around the bearing shaft. The driving roll serves to support and drive a vehicle wheel 11. Between the two conveying chains 1 there is also provided a travel path 12, which serves to support the vehicle wheel 11. The height of the slide strips 2 should be such that the driving roll 10 is held at the distance a from the travel path, such that it can rotate freely, as shown in FIG. 2.

In the apparatus according to the invention the two conveying chains 1 act at the same time as side guides for the vehicle wheel 11. For this reason the upper edges 5a, 6a and 5b, 6b of the upper end portions of the chain members 5, 6 are arranged at a distance a1 above the travel path 12, this distance a1 not exceeding approximately 60 mm. A distance a1 of, for example, 40 mm is also sufficient. However, it is important that the upper edges 5a, 6a and 5b, 6b of the chain members 5, 6 of the conveying chains 1 are not covered by any side guides, covers or chain guides, so that direct contact between the vehicle wheel 11 and the conveying chains 1 is possible. Thus, in contrast to known conveying apparatuses no additional side guides are provided for the vehicle wheel 11.

The distance A between the two conveying chains 1 can be of any size and designed in accordance with the largest expected tire width of a vehicle wheel 11. When the two conveying chains 1 are moving synchronously in the direction F the driving roll 10 comes to rest against the vehicle wheel 11, whereby the vehicle wheel and therby also the vehicle are pushed further in the direction F. At the same time the vehicle wheel rolls off along the travel path 12. It is held on the track by the two conveying chains 1. The direction of relative motion between the chain and the tires is more favorable than with known apparatuses, in which the side guides are arranged stationarily. As a result therof, the tendency for the vehicle wheel 11 to roll onto one of the conveying chains 1 is also less. However, if the diver causes the steering wheel to turn sharply the vehicle wheel 11 is steered against one of the conveyer chains and rolls onto the upper edges 5b, 6b of the chain members 5, 6. However, the vehicle wheel 11 is thereby lifted slightly from the travel path 12 and loses contact with the travel path. The vehicle wheel 11 is then only supported by the conveying chain 1 and the driving roll 10. Since the rotation of the vehicle wheel 11 in the direction B is effected exclusively by friction of the vehicle wheel 11 on the travel path 12, this rotation stops as soon as the vehicle wheel 11 loses contact with the travel path 12 on sharp turning of the steering wheel. However, if the vehicle wheel 11 is no longer rotated in direction B, there is no relative movement between the vehicle wheel 11 and the conveying chain and further rolling of the vehicle wheel 11 onto the conveying chain is prevented. Since the conveying chain 1 is arranged at a certain distance above the travel path 12, it also offers sufficient resistance against overrolling, such that the vehicle cannot be pulled off the track by the opposite vehicle wheel, which is similarly turned and unguided by a conveying chain. Tests have clearly proven this.

In order to exclude damage to the tire by the chains, it is appropriate for the upper edges 5b, 6b, on their surfaces facing the vehicle wheel, of the inner chain members 5, 6 to be convexly rounded by "inner" chain members we mean the chain members of the two conveying chains 1 facing the vehicle wheel.

In the exemplary embodiment shown in FIGS. 3 and 4 two opposing chain member 5' and 6' are connected together at their upper edges by a web 13 or 14. The two opposing chain members 5' and 6' and the web 13 or 14 may in this way form a one-piece chain member part with a U-shaped cross section. In this way, the conveying chains 1' are substantially closed at the top and also rounded at their edges. Damage to a tire is thus likewise prevented.

For the same purpose it is also possible so to construct the inner chain member 5", 6" facing the vehicle wheel 11 that they comprise bends 15, 16 at their upper edges directed towards the longitudinal central plane of the chains, i.e. outwards with respect to the vehicle wheel 11.

To prevent damage to the tires by the conveying chains it would also optionally be possible to provide th chain members with a cover 20 of plastics material. This cover can either cover only the inner chain members facing the vehicle wheel and the upper edges of said chain members, or it can extend with a U-shaped cross section open at the bottom over the whole chain width.

I claim:

1. An apparatus for conveying motor vehicles through vehicle washing installations, comprising:
   a pair of fixedy supported, parallel, spaced slide strips extending in a longitudinal direction of the washing installation, a pair of endless, plate link chains respectively slidably supported on said slide strips for sliding movement in the longitudinal direction, means for defining a longitudinally extending travel path between said chains and said slide strips and adapted for supporting a wheel of the vehicle, a plurality of longitudinally spaced bearing shafts connected between said chains above said travel path and extending transversely at right angles to said chains, each said bearing shaft carrying a driving roll adapted to push the vehicle wheel supported on said travel path, said driving rolls being carried rotatably on said bearing shafts and oriented so as to be spaced above said travel path, and chain guide rails provided adjacent respective said chains and on opposite lateral sides of said travel path and extending longitudinally alongside said chains, said chains including linked, platelike chain members which project vertically above said travel path and have upper end means which are positioned above said travel path, said chains being freely accessible for a vehicle wheel to roll from said travel path up onto said upper end means, and said chain members, as supported on said slide strips, being adapted to support the vehicle wheel when the vehicle wheel rests directly on said upper end means.

2. The apparatus according to claim 1, wherein said upper end means of said chain members constitute upper edges of said platelike chain members, and wherein each of said chain members has a surface which faces toward the path of said vehicle wheel, said surface being convexly rounded away from said path adjacent said upper edge.

3. The apparatus according to claim 2, wherein each of said chain members includes a cover made of a plastics material and provided on said upper edge thereof.

4. The apparatus according to claim 1, wherein said upper end means of said chain members constitute upper edges of said platelike chain members, and are bent such that said upper edges face transversely away from said travel path.

5. The apparatus according to claim 4, wherein each said chain member includes a cover made of a plastics material and provided on said upper edge thereof.

6. The apparatus according to claim 1, wherein each of said chains includes a pair of longitudinally extending, transversely spaced, parallel sets of said linked, platelike chain members, an inner one of said sets being adjacent said travel path, an outer one of said sets being transversely spaced from said travel path.

7. The apparatus according to claim 6, wherein respective pairs of said upper end means of said chain members of said inner and outer sets are connected by respective transverse webs which extend transversely therebetween.

8. The apparatus according to claim 7, wherein respective said upper end means of said chain members of said inner and outer sets are integrally formed with respective said webs to produce a unitary chain member part having a U-shaped cross section.

9. The apparatus according to claim 6, wherein said upper end means of said chain members constitute upper edges of said platelike chain members, and wherein each of said chain members of said inner set has a surface which faces toward said path of said vehicle wheel, said surface being convexly rounded away from said path adjacent said upper edge.

10. The apparatus according to claim 9, wherein each of said chain members of said inner set includes a cover made of a plastics material and provided on said upper edge thereof.

11. The apparatus according to claim 6, wherein said upper end means of said chain members of said inner set constitute upper edges of said platelike chain members, and are bent such that said upper edges face transversely away from said travel path.

12. The apparatus according to claim 11, wherein each said chain member of said inner set includes a cover made of a plastics material and provided on said upper edge thereof.

13. The apparatus according to claim 1, wherein said upper end means of said chain members constitute upper edges of said platelike chain members which are disposed at most 60 mm above said travel path.

14. The apparatus according to claim 1, wherein each said chain guide rail has a substantially right angle cross-section, including a vertical leg and a horizontal leg, said vertical leg extending upwardly alongside said chain, and wherein said upper end means of said chain members constitute upper edges of said platelike chain members, said vertical leg terminating vertically below said upper edges of said chain members.

15. An apparatus for conveying motor vehicles through vehicle washing installations, comprising:
   a pair of fixedly supported, parallel, spaced slide strips extending in a longitudinal direction of the washing installation, a pair of endless, plate link chains respectively slidably supported on said slide strips for sliding movement in the longitudinal direction, means for defining a longitudinally extending travel path between said chains and said slide strips and adapted for supporting a wheel of the vehicle, and means connected between said chains above said travel path for pushing the vehicle wheel supported on said travel path, said chains including linked, platelike chain members which project vertically above said travel path and have upper end means which are positioned above said travel path, said chains being freely accessible for a vehicle wheel to roll from said travel path up onto said upper end means, and said chain members, as supported on said slide strips, being adapted to support the vehicle wheel when the vehicle wheel rests directly on said upper end means.

16. The apparatus according to claim 15, wherein said upper end means of said chain members constitute upper edges of said platelike chain members, and wherein each of said chain members has a surface which faces toward the path of said vehicle wheel, said surface being convexly rounded away from said path adjacent said upper edge.

17. The apparatus according to claim 15, wherein said upper end means of chain members constitute upper edges of said platelike chain members, and are bent such that said upper edges face transversely away from said travel path.

18. The apparatus according to claim 15, wherein each of said chains includes a pair of longitudinally extending, transversely spaced, parallel sets of said linked, platelike chain members, an inner one of said sets being adjacent said travel path, and outer one of said sets being transversely spaced from said travel path, and wherein respective pairs of said upper end means of said chain members of said inner and outer sets are connected by respective transverse webs which extend transversely therebetween.

19. The apparatus according to claim 18, wherein respective said upper end means of said chain members of said inner and outer sets are integrally formed with respective said webs to produce a unitary chain member part having a U-shaped cross section.

* * * * *